United States Patent [19]

Funado

[11] Patent Number: 5,475,447
[45] Date of Patent: Dec. 12, 1995

[54] APPARATUS AND METHOD FOR ADJUSTING VIDEO DISPLAY

[75] Inventor: Shigeto Funado, Saitama, Japan

[73] Assignee: Sony Corporation, Tokyo, Japan

[21] Appl. No.: 173,144

[22] Filed: Dec. 23, 1993

Related U.S. Application Data

[63] Continuation of Ser. No. 829,291, Feb. 3, 1992.

[30] Foreign Application Priority Data

Feb. 8, 1991 [JP] Japan ................................. 3-037763

[51] Int. Cl.⁶ ............................. H04N 9/28; H04N 9/31
[52] U.S. Cl. ........................................... 348/745; 348/746
[58] Field of Search ........................... 348/745, 746, 348/747, 806, 807, 808, 181, 189, 190, 191; 315/368.11, 368.12, 368.13, 368.18; H04N 9/28, 9/31

[56] References Cited

U.S. PATENT DOCUMENTS

| | | | |
|---|---|---|---|
| 4,684,996 | 8/1987 | Baumeister | 358/231 |
| 4,703,344 | 10/1987 | Hisano et al. | 358/60 |
| 4,827,334 | 5/1989 | Johnson . | |
| 4,857,998 | 8/1989 | Tsujihara et al. | 358/10 |
| 4,999,703 | 3/1991 | Henderson | 358/64 |
| 5,091,773 | 2/1992 | Fouche et al. | 348/806 |
| 5,231,481 | 7/1993 | Eollzan et al. | 348/745 |

FOREIGN PATENT DOCUMENTS

| | | | |
|---|---|---|---|
| 39209955 | 1/1991 | Germany | H04N 9/28 |
| 0034693 | 2/1991 | Japan | H04N 9/28 |

OTHER PUBLICATIONS

Patent Abstracts of Japan, vol. 12, No. 385, Oct. 14, 1988, (Ooya).
Patent Abstracts of Japan, vol. 8, No. 135, Jun. 22, 1984, (Oonishi).

*Primary Examiner*—James J. Groody
*Assistant Examiner*—Michael H. Lee
*Attorney, Agent, or Firm*—Jay H. Maioli

[57] ABSTRACT

An apparatus and a method for adjusting a video display, device with no need to determine precisely the positional relationship between an image producing element and the video display area of a projector or monitor while the latter device is being adjusted for video display by detecting beam positions. The entire video display area is detected by a image input. Camera and the video display area information thus obtained is represented by the coordinates, in a memory, of four points enclosing the area. The memory coordinates of the first points to be obtained based on a reference image are calculated from the coordinates of these four points. The coordinates of the first points are compared with those of the second points determined with respect to the reference image. The result is used to operate a system controller for adjustment and control of the video display device.

5 Claims, 8 Drawing Sheets

FIG. 2

| | 40a | 40b | | |
|---|---|---|---|---|
| $a_1$ | $a_2$ | $a_3$ | $a_4$ | $a_5$ |
| $a_6$ | $a_7$ | $a_8$ | $a_9$ | $a_{10}$ |
| $a_{11}$ | $a_{12}$ | $a_{13}$ | $a_{14}$ | $a_{15}$ |
| $a_{16}$ | $a_{17}$ | $a_{18}$ | $a_{19}$ | $a_{20}$ |
| $a_{21}$ | $a_{22}$ | $a_{23}$ | $a_{24}$ | $a_{25}$ |

FIG. 3

| $c_1$ | $c_2$ | $c_3$ | $c_4$ | $c_5$ |
|---|---|---|---|---|
| $c_6$ | $c_7$ | $c_8$ | $c_9$ | $c_{10}$ |
| $c_{11}$ | $c_{12}$ | $c_{13}$ | $c_{14}$ | $c_{15}$ |
| $c_{16}$ | $c_{17}$ | $c_{18}$ | $c_{19}$ | $c_{20}$ |
| $c_{21}$ | $c_{22}$ | $c_{23}$ | $c_{24}$ | $c_{25}$ |

FIG. 4A

| FIG. 4 |
|---|
| FIG. 4A |
| FIG. 4B |

- F101: MEMORIZE TAKEN IMAGE OF SCREEN TO FRAME MEMORY
- F102: DETECT POSITIONS OF $P_1$, $P_2$, $P_3$, $P_4$
- F103: CALCULATE REFERENCE POSITIONS ($C_{1m} \sim C_{25m}$)
- F104: HOLD REFERENCE POSITIONS DATA
- F105: DISPLAY VIDEO IMAGE OF RED REFERENCE PATTERN
- F106: MEMORIZE TAKEN IMAGE OF SCREEN TO FRAME MEMORY
- F107: DETECT A POSITION OF RED BEAM FROM PATTERN DATA
- F108: COMPARE RED BEAM POSITION AND REFERENCE POSITION
- F109: DO THEY COINCIDE ?
- F110: RED-CRT ADJUSTMENT

APPARATUS AND METHOD FOR ADJUSTING VIDEO DISPLAY

This is a continuation of application Ser. No. 07/829,291 filed Feb. 3, 1992.

BACKGROUND OF THE INVENTION

1. Field of the Invention

The present invention relates to an apparatus and a method for automatically adjusting the convergence (registration) and raster distortion in display devices such as projectors.

2. Description of the Prior Art

Whenever the monitor, projector or similar apparatus fails to have its red, green and blue beams converge on its screen (or on the fluorescent screen of a CRT), the reproduced image is necessarily poor in quality. To overcome such trouble requires adjusting the image distortion/convergence (called registration adjustment).

This kind of adjustment is accomplished by detecting the positions of the red, green and blue beams on the screen and by having them converge on predetermined absolute positions. Specifically, a projector may have a TV camera set up to photograph the screen on which to project images. On the screen, the TV camera takes pictures of dot patterns, round patterns or other appropriate images for adjustment. The resulting image signals (luminance data) are stored in a frame memory. The stored data are used to calculate beam positions. The calculated beam positions are compared with, and are made to converge on, predetermined absolute positions (i.e., the positions where the beams ought to be, obtained from the luminance data derived from the picture taking). Under the above scheme, the beam positions are represented ideally by coordinate positions in the frame memory.

One disadvantage of the above conventional scheme is that the screen and the TV camera must remain constant in relative position to each other while the TV camera takes in the image adjusting information from the screen so that the beam positions may be detected from that information. The absolute positions, with reference to which the beam positions detected as coordinate positions in the frame memory are adjusted, must also be represented by coordinates in the frame memory. Unless the screen and the TV camera stay constant in relative position to each other, no absolute position on the screen can be represented by frame memory coordinates. Without absolute positions, it is obviously impossible to cause the red, green and blue beams derived from the screen image to converge on any absolute reference position. Thus with the prior art, the above requirement must always be met: the screen and the TV camera must remain constant in relative position to each other. Otherwise, there is no way to adjust the image distortion/convergence (registration adjustment) whereby the red, green and blue beams are made to converge on reference absolute positions.

Consequently, the adjustment process based on the detected beam positions presupposes very strict positional designation of the screen and TV camera with respect to each other. This is not an easy task to accomplish.

In the case of a large-screen monitor, the adjustment of image distortion/convergence also presupposes the fulfillment of the above projector-associated requirement. That is, the screen and the TV camera must be positioned with strict precision to each other.

SUMMARY OF THE INVENTION

It is therefore an object of the present invention to overcome the above and other deficiencies and disadvantages of the prior art, and to improve the prior art.

In carrying out the invention and according to one aspect thereof, there is provided an adjustment apparatus for video display, comprising: a display member for displaying a video image; an image input member for taking the displayed image from the display member; a memory member for memorizing the image taken by the image input member; a calculating member for calculating position data from the memorized data in the memory member; a signal generating member for generating a video signal for adjustment of the display member; and a system control member for controlling the signal generating member.

In one preferred structure according to the invention, the calculating member calculates four edge positions of the video image taken from the display member.

With this structure, the display member may be a video projector, having a projecting member and a screen.

Also with this structure, the display member may be a cathode ray tube or a liquid crystal display.

According to another aspect of the invention, there is provided an adjustment method for video display, comprising the steps of: displaying a predetermined pattern; taking a video image of the displayed predetermined pattern; memorizing the taken image; calculating positions from the memorized data; controlling the generation of a signal from the calculated data; generating an adjustment pattern controlled by the calculated data; and displaying the signal generated as an adjustment pattern again.

With one preferred adjustment method according to the invention, the position calculating step calculates four edge positions of the taken video image.

With another preferred adjustment method, the position calculating step calculates first reference positions from the four edge positions and second reference positions from the memorized data.

That part of the video display area which is taken in by the image input member as a video signal (i.e., partial region of the screen or monitor) is represented by coordinates in the frame memory. At the same time, a pattern image shown as an adjustment pattern on the screen (of monitor, etc.) is also represented by frame memory coordinates. In this manner, every time the screen (of the monitor, etc.) and the image input member such as a TV camera are established in appropriate relative position to each other, the image display area and the adjustment pattern are also fixed in relative position to each other in terms of frame memory coordinates.

The absolute positions, with reference to which adjustments are carried out in a video display area, are calculated from four points representing that video display area. This establishes the beam positions with respect to the absolute positions, the beam positions having being detected from the pattern image. The scheme eliminates the need for precisely setting up the relative positional relationship between the screen (of monitor, etc.) and the image input member such as a TV camera every time a screening session is to take place.

These and other objects, features and advantages of the invention will become more apparent upon a reading of the following description and appended drawings.

BRIEF DESCRIPTION OF THE DRAWINGS

FIG. 2 is a view showing how the embodiment divides a screen;

FIG. 3 is a view depicting the center point of each of the screen regions obtained with the embodiment as it divides the screen;

FIG. 4(A) and 4(B) are a flowchart describing how a system controller of the embodiment operates;

DESCRIPTION OF THE PREFERRED EMBODIMENT

Figure 1:
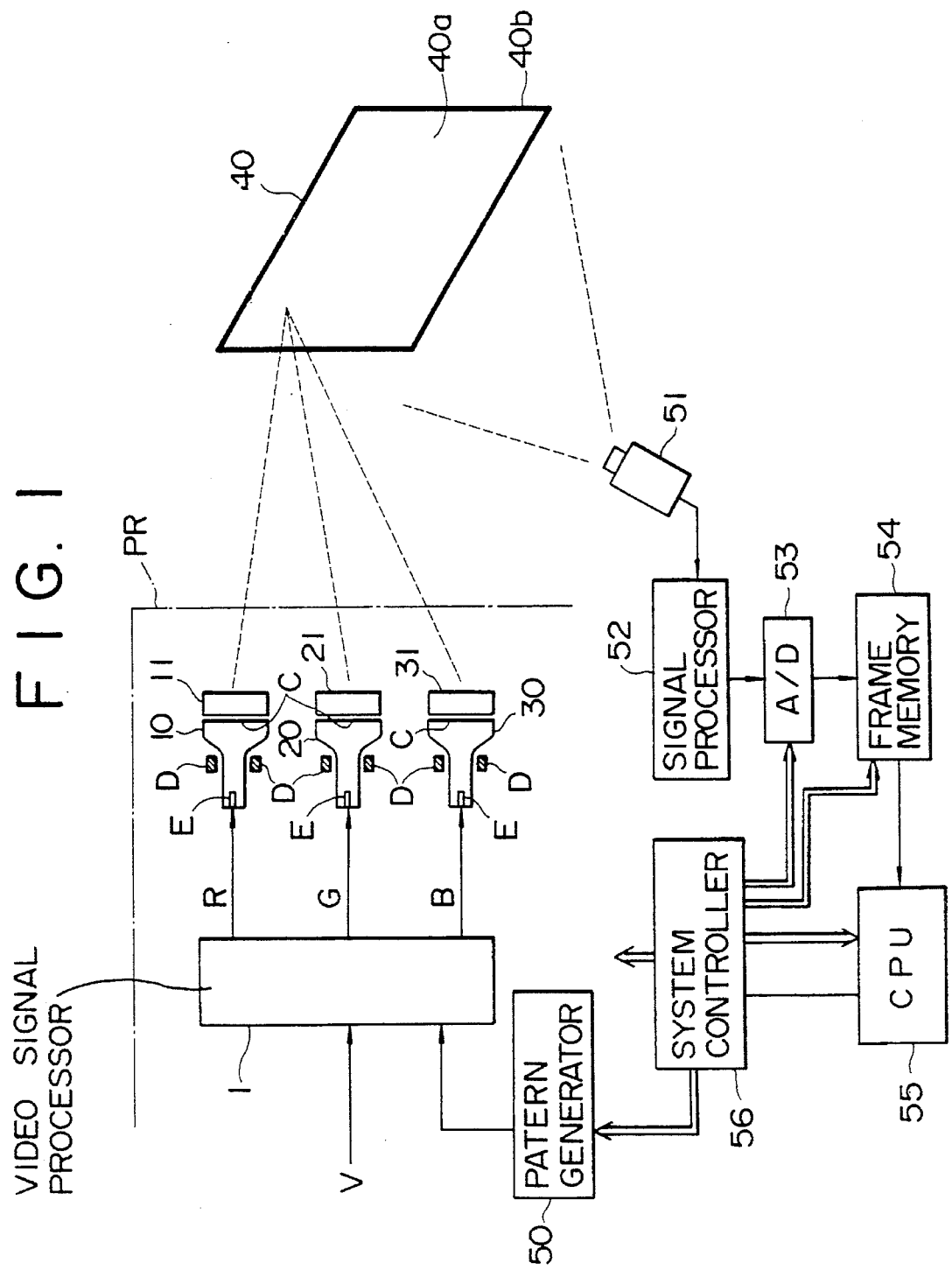
FIG. 1 is a block diagram of a projector incorporating an embodiment of the invention.

FIG. 1 is a block diagram of a projector incorporating an apparatus and a method for video display adjustment practiced as the preferred embodiment of the invention. In FIG. 1, reference numeral 1 is a video signal processor, a circuit system for processing a video signal V reproduced by a projector PR; 10, 20 and 30 are high luminance monochromatic projection tubes having display surfaces C containing red, green and blue luminescent films, respectively; and 11, 21 and 31 are lens systems allowing the monochromatic projection tubes to form video images on a screen 40. With each monochromatic projection tube, reference character E stands for an electron gun and D for a deflector.

In the projector PR, the projection tubes 10, 20 and 30 are supplied respectively with red, green and blue video signals from the video signal processor 1. The video signals modulate the electron beams of the projection tubes so that the monochromatic images reproduced on the display surfaces C are overlaid via the lens systems 11, 21 and 31 onto the screen 40 where a composite color video image will be formed.

A pattern generator 50 outputs pattern video signals such as round and dot patterns for adjustment which are needed to detect beam positions upon adjustment of registration and other characteristics. The output of the pattern generator 50 is fed via the video signal processor 1 to the red, green and blue beam projection tubes 10, 20 and 30 so that the -tubes will form their respective monochromatic pattern video images.

A TV camera 51 is located so as to take pictures of the entire screen 40. The screen 40 has a video display area 40a enclosed by a frame 40b, the area showing video images. Such video images are taken in by the TV camera 51 and are converted to a video signal (luminance data) via a signal processor 52.

An A/D converter 53 converts the output of the signal processor 52 from analog to digital format at a predetermined timing. A frame memory 54 accommodates the luminance signal after its conversion to digital data.

A central processing unit (CPU) 55 performs calculations on the basis of the data stored in the frame memory 54.

These calculations will be described later in more detail.

A system controller 56 is a microcomputer-based controller that controls the operations of the A/D converter 53, frame memory 54, CPU 55 and pattern generator 50. The system controller 56 also controls registration adjusting means, not shown, for automatic registration adjustment regarding each electron beam. This adjustment is carried out to converge the electron beams.

The above-described physical embodiment adjusts registration illustratively on the basis of detected beam positions. The registration adjustment involves converging the red, green and blue beams in all divided regions, at the center as well as in the periphery, of the video display area 40a so that a high quality video image will be obtained. To accomplish this adjustment illustratively requires dividing the video display area 40a into a predetermined number of regions. Beam positions are detected in each divided region. The detected beam positions are made to converge on the positions that are established as the appropriate beam positions.

Illustratively, the video display area 40a of the screen 40 is divided into regions a1 through $a_{25}$, as shown in FIG. 2. The regions $a_1$ through $a_{25}$ have their respective center points, indicated as $C_1$ through $C_{25}$ in FIG. 3.

Figure 4B:
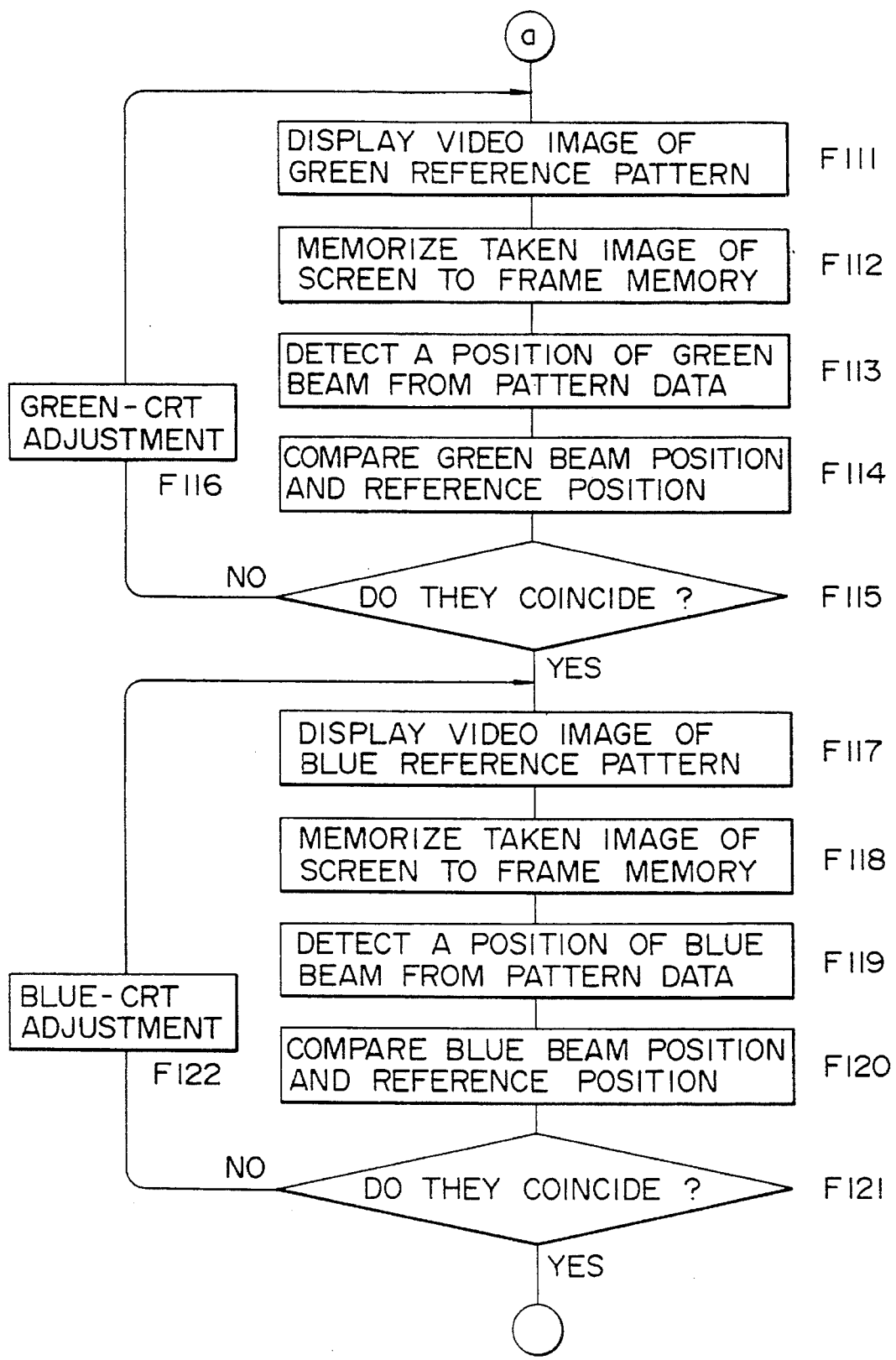

Below is a description, with reference to the flowchart of FIG. 4, of how the system controller 56 operates so as to converge the center points of the red, green and blue beams on the point $C_1$.

Figure 5:
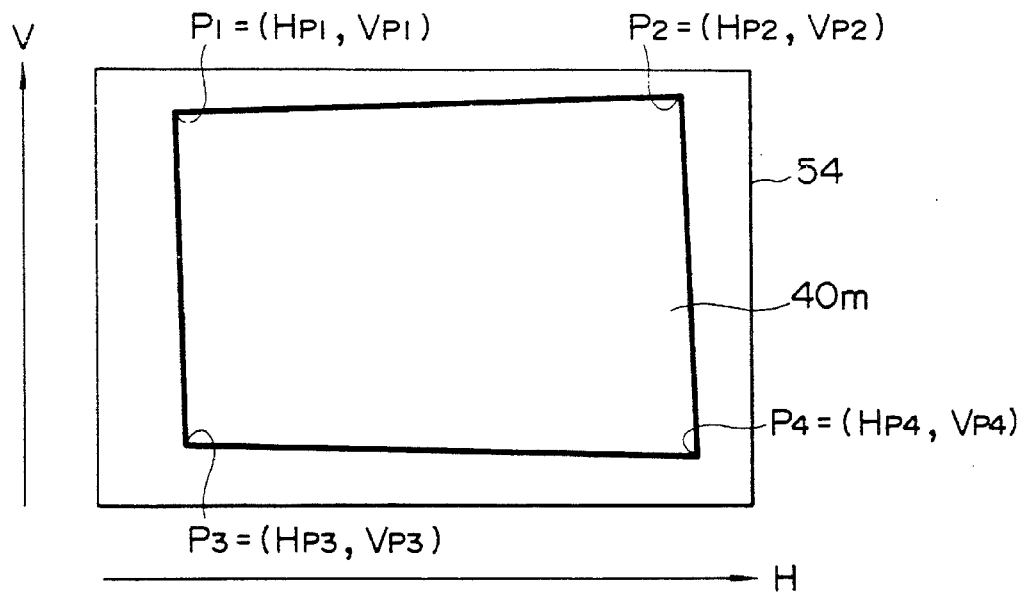
FIG. 5 is a view indicating screen data held in a frame memory of the embodiment.
Figure 6:
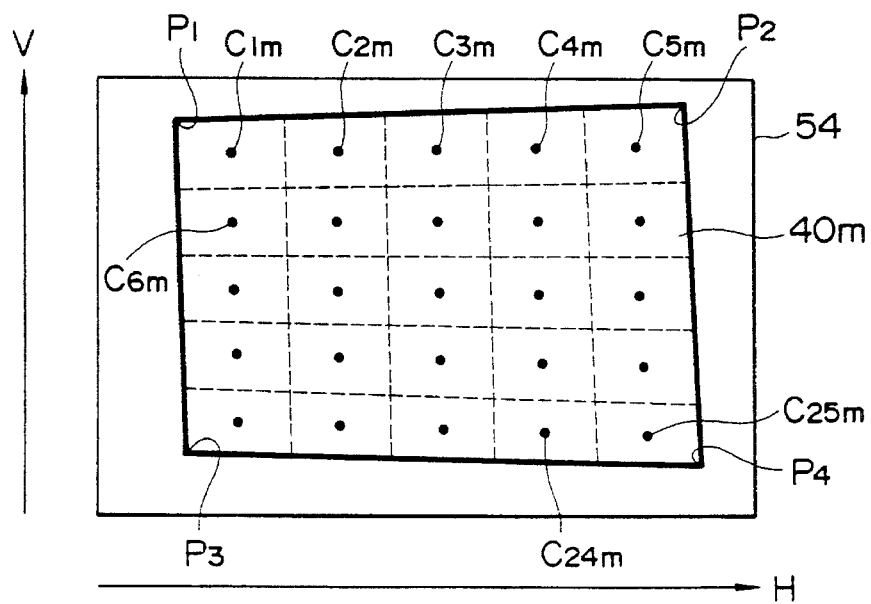
FIG. 6 is a view showing absolute positions calculated from four positions representing a video display area.

In step F101, the TV camera 51 takes in the screen 40 as it has no image projected thereon, the resulting video signal (luminance information) being converted from analog to digital format before storage into the frame memory 54. The screen 40 and the TV camera 51 need not be positioned with precision relative to each other. They are only positioned so that the camera 51 may photograph the entire screen 40. That is, the image taken of the screen 40 does not necessarily represent the screen 40 as it actually is; an image 40m of the screen 40 stored in the frame memory 54 can be inclined, or the scales of the sides may fail to match, as depicted in FIG. 5.

In step F102, the four corner positions $P_1$ through $P_4$ of the screen image 40m are detected. Since the screen 40 is enclosed by the frame 40b as described, the CPU 55 takes in the luminance information from the frame memory 54 for image processing. This permits easy detection of the four corner positions $P_1$ through $P_4$ of the screen image 40m. That is, the CPU 55 detects the four positions as coordinate values $(H_{p1}, V_{p1})$, $(H_{p2}, V_{p2})$, $(H_{p3}, V_{p3})$ and $(H_{p4}, V_{p4})$ in the frame memory 54.

Once the coordinate range of the screen image 40m is known, all positions within the video display area may be calculated and represented in terms of coordinates in the frame memory 54. For example, the center points $C_1$ through $C_{25}$ of the regions $a_1$ through $a_{25}$ in FIG. 3 are geometrically calculated from the coordinate values of $P_1$ through $P_4$ and represented in coordinates. That is, the coordinates of $(H_{c1}, V_{c1})$ through $(H_{c25}, V_{c25})$ represent all center points $C_{1m}$ through $C_{25m}$ of the regions making up the screen image 40m, these center points being held in the frame memory 54 and corresponding to the actual center points $C_1$ through $C_{25}$ of the screen 40.

Thus the CPU 55 calculates the center points $C_{1m}$ through $C_{25m}$ as coordinates in step F103. In step F104, the values of the coordinates $(H_{c1}, V_{c1})$ through $(H_{c25}, V_{c25})$ are taken in by the system controller 56 as absolute positions that provide reference to adjustments; the coordinate values are held in an internal work RAM.

Once the coordinates ($H_{c1}$, $V_{c1}$) through ($H_{c25}$, $V_{c25}$) of the center points $C_{1m}$ through $C_{25m}$ in the frame memory 54 are obtained, the beam center position in each of the target regions ($a_1$ through $a_{25}$) on each of the CRT's 10, 20 and 30 is acquired as coordinates in the frame memory 54. Then registration is adjusted in such a manner that the coordinates will converge respectively on the center points $C_{1m}$ through $C_{25m}$. This completes the adjustment process.

Figure 7:
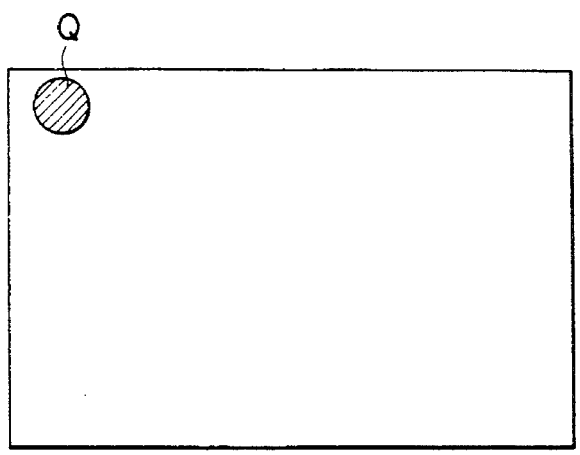
FIG. 7 is a view depicting a typical adjustment pattern image given by the embodiment.

Illustratively, the CRT 10 is adjusted for the region $a_1$ as follows. In step F105, the system controller 56 gets the pattern generator 50 to output a video signal representing a round pattern Q whose center point is $C_1$ of the region $a_1$ on the screen 40, as shown in FIG. 7. This round pattern is output as a red image given by the red signal alone. The CRT's 20 and 30 are not used here.

Figure 8:
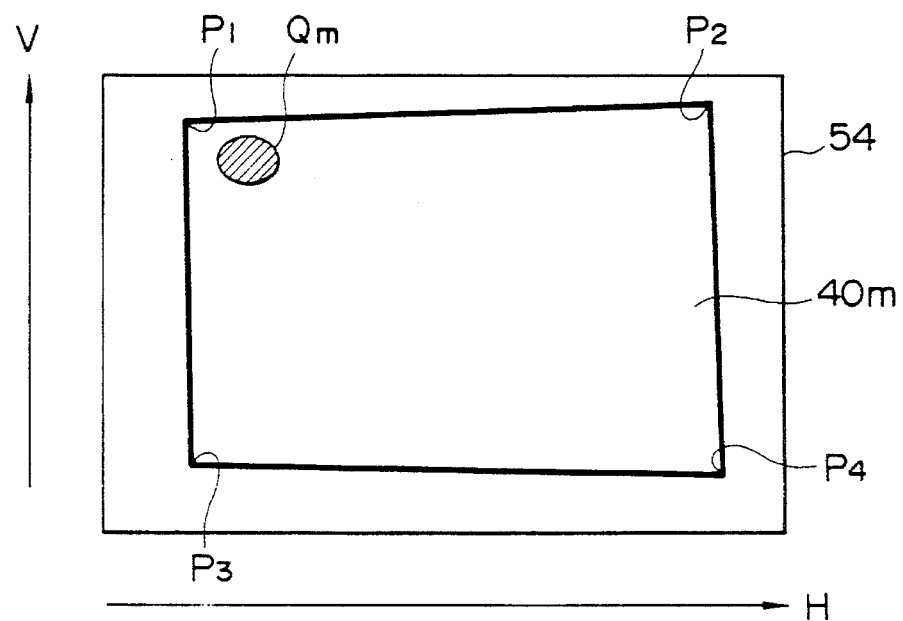
FIG. 8 is a view describing pattern image data held in a frame memory of the embodiment.

The TV camera 51 takes picture of the screen 40 bearing the image of FIG. 7, the resulting video signal (luminance information) being converted from analog to digital format and stored into the frame memory 54 in step F106. The frame memory 54 stores the image of the round pattern Q as it turns into a deformed round pattern Qm when projected onto the screen 40, as shown in FIG. 8. The inclination and the scales of the sides regarding the pattern Qm are different from those of the actual round pattern on the screen. The stored image, corresponding to the true round pattern Q on the screen 40, is the same as the screen image obtained in step F101. The image of the round pattern Qm typically appears elliptical or similarly deformed.

The center of gravity of the deformed round pattern Qm is then obtained. The coordinates of the center of gravity are those in the frame memory 54 which represent the beam center position of the CRT 1 in the region $a_1$. The reason for this is that the center of gravity of a circle remains unchanged even if the image thereof develops a rotational divergence due to a misalignment of the projector P or to a skew-caused pattern deformation. For the same reason, although the image of a true circle may be perceived illustratively as elliptical, the center of the true circle still coincides with the center of gravity of the elliptical or otherwise deformed circle.

In step F107, the CPU 55 calculates horizontal and vertical luminance distribution data from the data in the frame memory 54, and finds the centers of gravity for the horizontal and the vertical luminance distribution data thus calculated. The two-stage calculation process provides the center of gravity for the round pattern projected on the screen 40, i.e., the beam center position of the CRT 10 in the region $a_1$.

Figure 9:
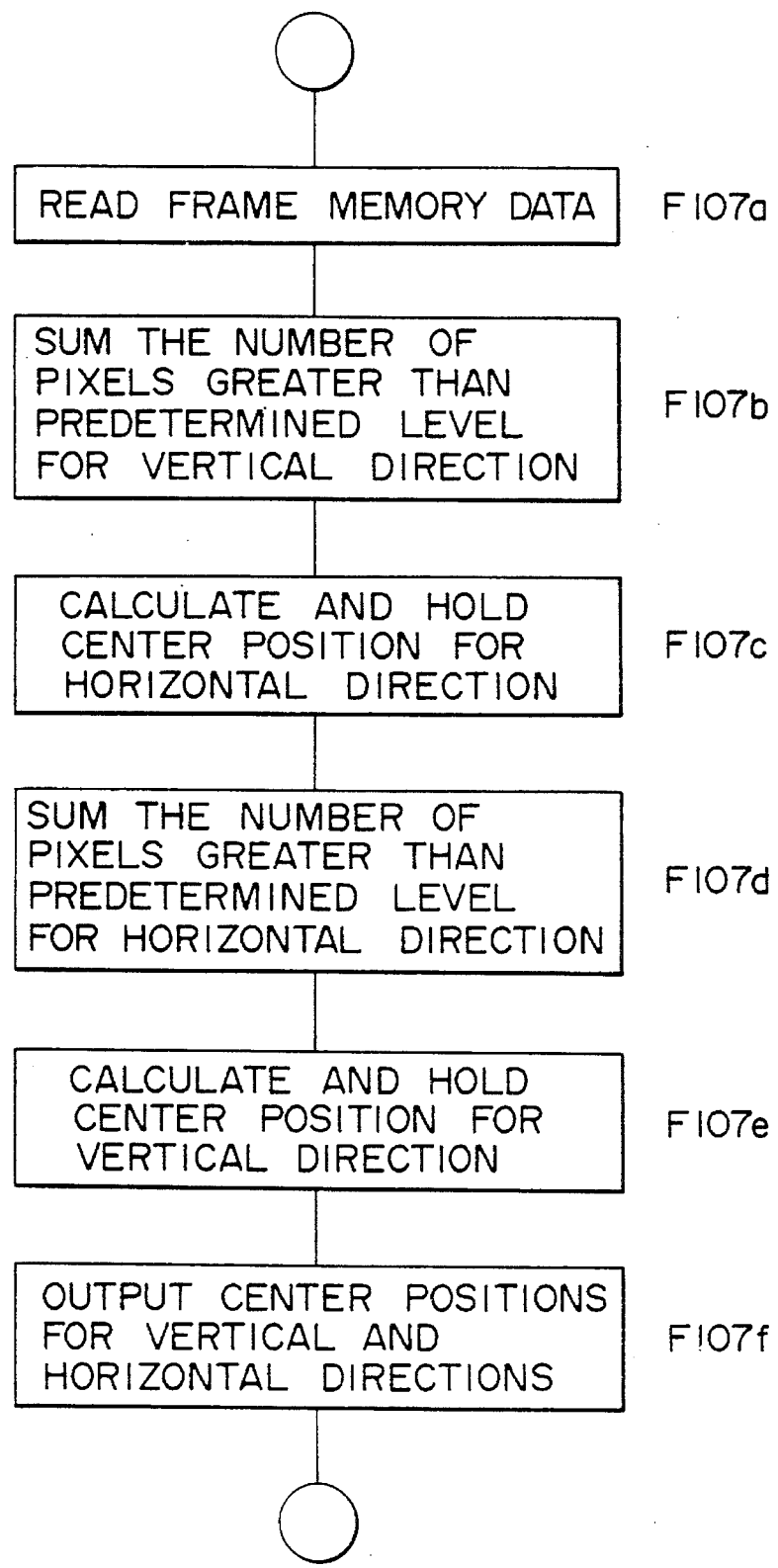
FIG. 9 is a flowchart indicating how the CPU of the embodiment operates.
Figure 10:
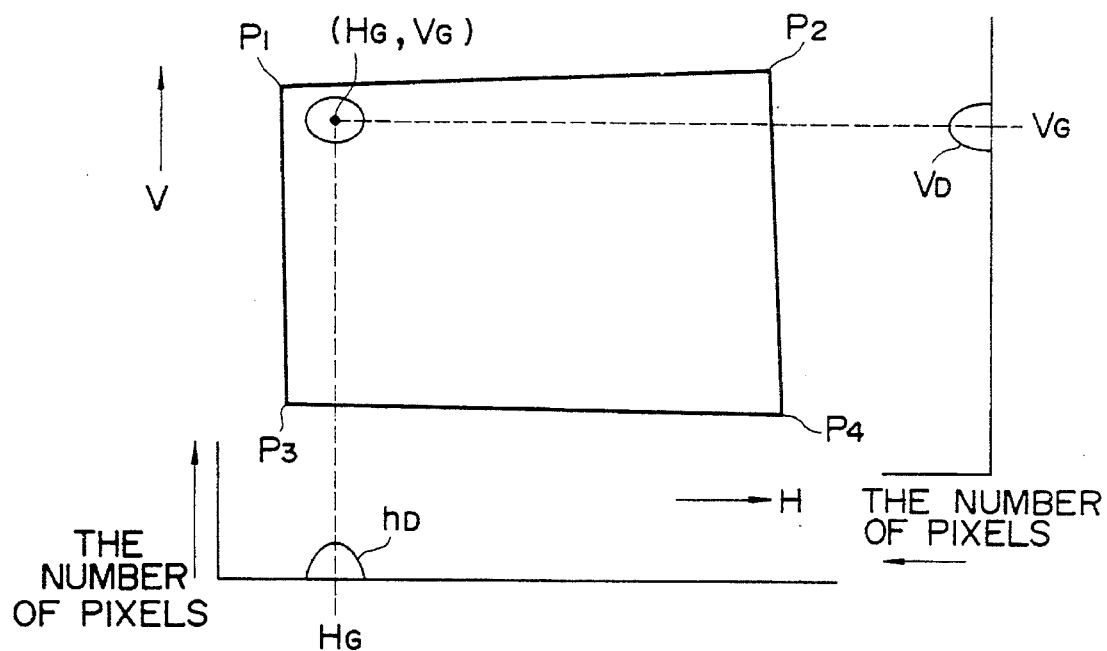
FIG. 10 is a view showing how the CPU of the embodiment calculates a center of gravity.
Figure 11:
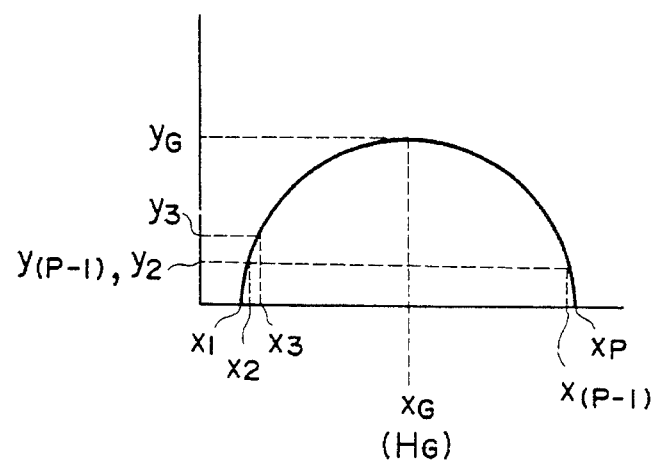
FIG. 11 is a view depicting how the CPU of the embodiment calculates another center of gravity.

An example of the calculations by the CPU 55 in step F107 will now be described with reference to the flowchart of FIG. 9 and to FIGS. 10 and 11. In sub-step F107a, of the data placed in the frame memory 54 in step F106 of FIG. 4, those data on the region enclosed by positions $P_1$, $P_2$, $P_3$ and $P_4$ are read into the CPU 55 under control of the system controller 56. The enclosed region corresponds to the video display are a 50a of the screen 40. The read data are accumulated in the vertical direction, in substep F107b, so as to find horizontal luminance distribution data $h_D$ (FIG. 9).

Where the horizontal luminance distribution data $h_D$ are to be acquired, the number of pixels Dmn ($D_{11}, \ldots D_{MN}$) read from the frame memory 54 represents a luminance level. Thus a predetermined threshold value Ls may be established, and the number of pixels Dmn may be accumulated in the vertical direction so that Dmn>Ls The horizontal luminance distribution data $h_D$ thus obtained provide a semicircle of FIG. 10. The data $h_D$ are used further for calculations designed to find the center of gravity of the circle in the horizontal direction, in sub-step F107c, details of which will follow:

With the data $h_D$ (on semicircle) extracted, it is assumed that X coordinates stand for position information and Y coordinates for pixel counts, as depicted in FIG. 11. It is also assumed that the X coordinates $X_1 \ldots X_p$ correspond with Y coordinates $Y_1 \ldots Y_p$, respectively, and that $X_G$ represents the center of gravity $H_G$ of the circle in the horizontal direction. Given the above assumptions, one gets $$(X_1-X_G)y_1+(X_2-X_G)y_2+ \ldots +(X_p-X_G)y_p=0$$

Thus the center of gravity $X_G$ is given as $$x_G = \frac{x_1y_1 + x_2y_2 + \ldots + x_py_p}{y_1 + y_2 + \ldots + y_p}$$

After the center of gravity $H_G$ ($X_G$) of the circle in the horizontal direction is obtained in sub-step F107c, that value of $H_G$ is maintained. In sub-step F107d, the data that were read from the frame memory 54 in sub-step F107a are now accumulated in the horizontal direction so as to find the vertical luminance distribution data $V_D$. As in sub-step F107c, the center of gravity $V_G$ of the circle in the vertical direction is calculated in sub-step F107e from the luminance distribution data $V_D$.

As described, the luminance distribution is calculated in the horizontal and vertical directions, and the centers of gravity are acquired from the luminance distribution data thus calculated. These calculations provide the centers of gravity of the circular pattern Qm in the horizontal and vertical directions, i.e., coordinates $H_G$ and $V_G$ representing the beam center position in the frame memory 54. In sub-step F107f, the CPU 55 supplies the system controller 56 with the coordinates ($H_G$, $V_G$) as the beam center position coordinates.

Thus the beam center position of the CRT 10 in the region $a_1$ is obtained by the CPU 55 in terms of the coordinates ($H_G$, $V_G$) in the frame memory 54. In step F108, the system controller 56 compares the coordinates of the beam center position with the coordinates ($H_{c1}$, $V_{c1}$) representing the center point $C_{1m}$ of the region $a_1$, the latter coordinates having been calculated beforehand. Following the comparison-based decision in step F109, the system controller 56 controls the video signal processor 1 so as to adjust the actual registration in step F110. Steps F105 through F108 are repeated until the coordinates ($H_G$, $V_G$) coincide eventually with the coordinates ($H_{c1}$, $V_{c1}$) in step F109.

With the CRT 10 thus adjusted, a green image of the round pattern Q in FIG. 7 is generated by the pattern generator 50. The registration of the CRT 20 is adjusted likewise with the green image in steps F111 through F116. Thereafter, a blue image of the round pattern Q is generated by the pattern generator 50; the registration of the CRT 30 is adjusted likewise in steps F117 through F122.

The steps described above accomplish automatic adjustment of the registration in the region $a_1$. For each of the regions $a_2$ through $a_{25}$, a red, a green and a blue circle are generated. Each of these circles has its center coincide with each of the center points ($C_2$ through $C_{25}$). The same adjustments are carried out when the beam center positions of these regions are detected and compared respectively with the center points ($C_{2m}$ through $C_{25m}$) in the frame memory 54.

With the above embodiment, the beam center position is obtained by calculating the center of gravity of a round pattern. Alternatively, dot patterns, lozenge patterns or other patterns may also be used for calculation.

Also with the embodiment, the beam center position is compared with the center point of each of the divided regions ($C_{2m}$ through $C_{25m}$), each region's center point being taken as reference for adjustment. However, any position may be calculated for reference as long as it is located within the region enclosed by $P_1, P_2, P_3$ and $P_4$ in the frame memory 54, it follows that reference values for adjustment may be established in many ways for various display pattern images for adjustment, and that there are diverse ways in which to compare the reference values with the observations. Furthermore, the screen regions are not limited to the regions al through $a_{25}$. In some cases, there may be no need to divide the video display area into smaller regions.

In any case, the display adjustment method as embodied above according to the invention involves having the four corners of the video display area 40a of the screen 40 determined beforehand by the coordinates of $P_1, P_2, P_3$ and $P_4$ in the frame memory 54. The reference positions for adjustment in the video display area 40a are calculated from the coordinates $(H_{p1}, V_{p1})$, $(H_{p2}, V_{p2})$, $(H_{p3}, V_{p3})$ and $(H_{p4}, V_{p4})$, and are held as they are in the frame memory 54. Moreover, the information obtained from the pattern image projected onto the screen 40 is acquired as coordinates in the frame memory 54. Therefore, the relative positional relationship between the reference coordinates and the coordinates of the information obtained from the pattern image is fixed in units of adjustment steps. That in turn means there is no need to designate precisely the positional relationship between the screen 40 and the TV camera 51 at the time of the adjustment based on beam position detection.

Although the description of the above embodiment has centered mainly on the adjustment of registration in the projector, the invention may be applied to all kinds of adjustments involved in detecting the beam position with image input means of an image output device. Such adjustments include those of convergence and raster distortion with the monitor CRT.

As described and according to the invention, the entire video display area is determined by the coordinates of four points in memory means. The coordinates of the first points to be obtained based on a pattern image are calculated from the coordinates of the four predetermined points. The coordinates of the first points are then compared with those of second points determined based on the pattern image. The result of the comparison permits effective video display adjustment. In this manner, there is no need to determine precisely the positional relationship between the video display area and the image input means when the projector or monitor is adjusted. This provides the benefit of drastically simplified procedures for video display adjustment.

As many apparently different embodiments of this invention may be made without departing from the spirit and scope thereof, it is to be understood that the invention is not limited to the specific embodiments thereof except as defined in the appended claims.

What is claimed is:

1. An adjustment apparatus for a video display system, comprising:

a display member for displaying a video image on a rectangular video display screen enclosed by a rectangular frame;

an image input member for detecting an entire rectangular area of said display screen including detecting four corner positions of the rectangular frame and producing an output signal representing said display screen;

a memory member for memorizing the output signal produced by said image input member;

a calculating member connected to said memory member for calculating coordinates for the four corner positions detected by said image input member and calculating a plurality of reference positions within the area of the display screen member based upon calculated four corner coordinates, said plurality of reference positions being stored in said memory means;

a signal generating member for generating a video signal having a pattern corresponding to said plurality of reference positions from said calculating member and displayed on said display screen by said display member, said image input member detecting said pattern and producing an output for storage in said memory member, whereby said calculating member calculates an adjustment value for adjusting said display member by comparing the stored reference positions and the stored detected pattern; and a system control member for controlling operations of said signal generating member, said memory member, and said calculating member.

2. An adjustment apparatus for a video display system as claimed in claim 1, wherein said display member comprises a video projector having projecting elements for displaying the video image on said display screen.

3. An adjustment apparatus for a video display system as claimed in claim 2, wherein said projecting elements comprise a plurality of color cathode ray tubes.

4. An adjustment apparatus for a video display system as claimed in claim 1, wherein said display member comprises a liquid crystal display having a plurality of pixels forming an image on said rectangular display screen.

5. An adjustment method for a video display system of the kind having a display area within a rectangular frame, comprising the steps of:

detecting an entire display area within the rectangular frame and producing coordinates corresponding to the four corners of the rectangular frame;

storing the produced coordinates of the four corners;

calculating a plurality of reference positions within the rectangular frame based on the stored coordinates of the four corners;

storing the calculated plurality of reference positions;

displaying a predetermined test pattern having a plurality of positions corresponding to said plurality of reference positions;

storing the displayed positions of the test pattern;

comparing a respective stored reference position and a stored test pattern position and producing a comparison result;

calculating a position adjustment value based on the comparison result; and adjusting the video display system based upon the calculated position adjustment value.

* * * * *